(No Model.)
T. PILKINGTON.
STAMP STEM GUIDE.
No. 510,990. Patented Dec. 19, 1893.
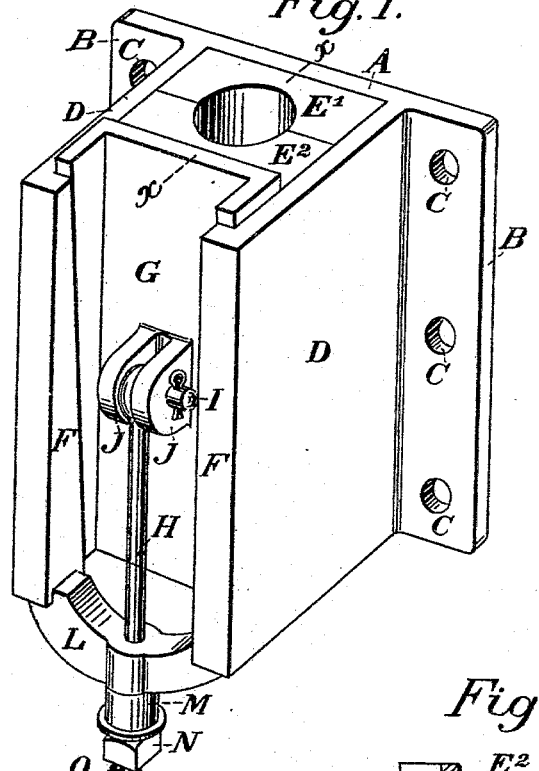
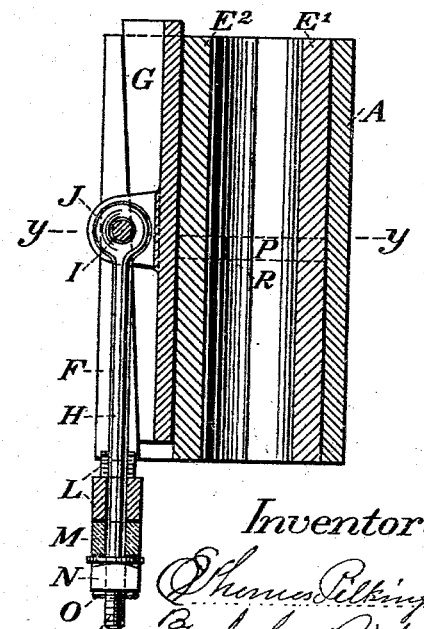
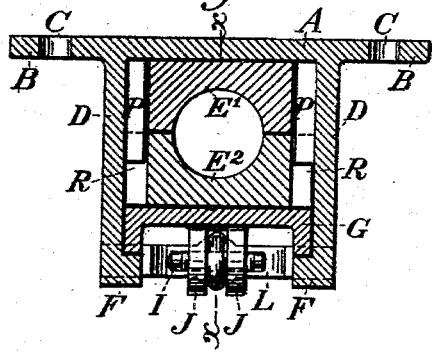
Witnesses:
E. A. Brandau
Wilson D. Bent Jr.
Inventor:
Thomas Pilkington
By John Richards
Atty

UNITED STATES PATENT OFFICE.

THOMAS PILKINGTON, OF SAN FRANCISCO, CALIFORNIA.

STAMP-STEM GUIDE.

SPECIFICATION forming part of Letters Patent No. 510,990, dated December 19, 1893.

Application filed June 8, 1893. Serial No. 476,989. (No model.)

*To all whom it may concern:*

Be it known that I, THOMAS PILKINGTON, a citizen of the United States, residing in the city and county of San Francisco and State of California, have invented a new and useful Improvement in Stamp-Stem Guides; and I hereby declare the following specification and the drawings therewith to be a full, clear, and exact description of my invention; also the method of constructing and applying the same.

My invention relates to stamp batteries for crushing ore or other mineral substances, and to the supports for guiding and sustaining the stems to which the stamp heads are attached, and consists in a separable bearing, preferably of wood, supported in a box or frame of metal, and held by means of a follower wedge and screw, so arranged that the parts are easily separable, and cannot be disarranged or disconnected by the jar and concussion of the falling stamps. My method of constructing these improved guides or bearings for stamp stems is shown in the accompanying drawings, in which—

Figure 1 is an elevation in perspective of a complete guide made according to my invention. Fig. 2 is a longitudinal section on the line $x$ $x$ of Fig. 1. Fig. 3 is a transverse section on the line $y$ $y$ of Fig. 2.

Similar letters of reference are employed to designate like parts throughout the different figures.

The main member A is made of metal with flanges B B and boltways C to be fastened to a crossbeam of the stamp frame in the usual manner. The bearing or guide shells E' E² are preferably made of wood, in two parts as shown, and wide enough to fit between the sides or flanges D D of the main member A. On the outer edge of these flanges D are wedge formed flanges F F, oblique on their inner faces to receive a tapering follower or wedge G, which bears against the flanges F and the outer half E² of the guide shells, as shown in the different figures of the drawings. This follower or wedge G is forced in and held in place by an eyebolt H attached to the lugs J J by a pin I, and passes through a bridge or arch piece L, that has its bearings on the sides of the main box or frame A, as seen in Fig. 1. Below this bridge I preferably place an elastic collar M, so as to neutralize the concussion of the stamps and consequent loosening of the nut N, also outside this nut and through the end of the bolt H, I insert a cross pin O, to guard against the nut falling off in case it is loosened by the jar of the falling stamps.

To hold the bearing shells E' E² longitudinally, I form rectangular ledges P P on the inside of the flanges D D, extending wholly across the rear half shell E', and partially across the front shell E², fitting into corresponding grooves formed in the sides of these shells. When the follower G is removed, the outer shell E² can be drawn forward until it passes or clears the ends of the ledges P P at R R and then can be removed endwise from the main body A. The rear shell can also be removed in the same manner by moving the stamp stem forward, so these shells or bearings E' E² can be removed, or replaced in a few minutes' time without interfering with or disturbing the main parts of the device.

The jar and concussion to which the guides or bearings of stamp stems are subjected, requires that no part shall be liable to give way or come loose, also that the bearing shells, which wear rapidly, should be quickly adjusted or replaced, and it is to the attainment of these objects my invention is directed.

Having thus explained the nature and objects of my invention, also the method of constructing and applying the same, what I claim as new, and desire to secure by Letters Patent, is—

1. In a stamp stem guide, a main supporting plate having side plates or flanges provided with wedge formed flanges on their inner opposing faces, the bearing shells located between the side plates and the wedging follower which presses the shells against the main plate, together with a device for forcing the wedge into place, substantially as described.

2. In a stamp stem guide, a main supporting plate, having side plates or flanges, provided with wedge formed flanges on their inner opposing faces, the bearing shells located between the side plates, the wedging follower which presses the shells against the main plate, a device for forcing the wedge into place and ledges on the side flanges fitting into corresponding grooves across the bearing shells to prevent end movement of the latter when in place, substantially as described.

3. In a stamp-stem guide, as herein described, a main fastening plate with side plates or flanges as shown; a retaining follower or wedge to press the bearing shells against the main plate, in the manner shown; ledges on the side flanges fitting into corresponding grooves across the bearing shells to prevent end movement of the latter when in place, in the manner substantially as described.

4. In a stamp-stem guide, as herein described, a rectangular three-sided box consisting of a base or main supporting plate and side flanges, between which the bearing shells are fitted; a tapering follower or wedge, and wedge formed flanges on the side plates against which the wedge bears; a screw-bolt to force in and retain the follower or wedge, and a removable bridge piece through which the screw-bolt passes that will swing out of the way and permit the removal of the follower or wedge without removing the screw-nut, in the manner substantially as described.

5. In a stamp-stem guide, as herein described, the combination of a main inclosing body or frame with flanges and boltways for attachment to the stamp framing, bearing shells fitting therein, and held longitudinally by ledges, and a cross groove in the sides of the shells as shown; a follower or wedge fitting against oblique ledges on the sides of the main body; a bolt and loose bridge piece, as shown, to force in and hold the follower, the bolt hinged so the bridge piece will swing clear of the sides when the screw is loosened, in the manner substantially as described.

In testimony whereof I have hereunto affixed my signature in the presence of two witnesses.

THOMAS PILKINGTON.

Witnesses:
ALFRED A. ENQUIST,
WILSON D. BENT, Jr.